United States Patent
Nagashima et al.

[11] Patent Number: 5,490,667
[45] Date of Patent: Feb. 13, 1996

[54] SHEET TRANSPORTATION APPARATUS CARRYING OUT ERROR DETERMINATION CONSIDERING SWITCHING OF SHEET TRANSPORTATION PATH

[75] Inventors: Teruo Nagashima, Sagamihara; Satoshi Oba, Machida; Tomomi Ishizuka, Hachiouji; Hiroyuki Masuda, Isehara, all of Japan

[73] Assignee: Minolta Co., Ltd., Osaka, Japan

[21] Appl. No.: 297,844

[22] Filed: Aug. 30, 1994

[30] Foreign Application Priority Data

Aug. 31, 1993  [JP]  Japan .................................. 5-215591

[51] Int. Cl.⁶ ................................................ B65H 5/00
[52] U.S. Cl. .................... 271/225; 271/3.19; 271/259; 271/258.04; 271/303; 271/186; 271/207
[58] Field of Search ........................ 271/3.14, 3.18, 271/3.19, 3.2, 225, 258.01, 259, 258.03, 258.04, 265.04, 291, 303, 304, 184, 185, 186, 207, 213

[56] References Cited

U.S. PATENT DOCUMENTS

| | | |
|---|---|---|
| 4,101,018 | 7/1978 | Sokolowski ........................ 271/3.14 |
| 4,392,740 | 7/1983 | Ito et al. . |
| 4,394,088 | 7/1983 | Hanamoto et al. . |
| 4,945,390 | 7/1990 | Hasegawa et al. . |
| 4,990,965 | 2/1991 | Kiya ........................................ 271/291 |
| 5,076,560 | 12/1991 | Russel .................................... 271/3.19 |
| 5,181,714 | 1/1993 | Yamagishi et al. ..................... 271/186 |
| 5,395,106 | 3/1995 | Tohnai et al. ....................... 271/258.04 |

FOREIGN PATENT DOCUMENTS 0235166  10/1987  Japan .................................. 271/291

Primary Examiner—H. Grant Skaggs
Attorney, Agent, or Firm—Burns, Doane, Swecker & Mathis

[57] ABSTRACT

A timer starts when a first sensor detecting "close" of a switching cover and a second sensor detecting "open" of the switching cover are both OFF at the start of a read out operation. When one of said first and second sensors is turned on before the timer expires, an error is not displayed and the flow proceeds to a subsequent process. When first and second sensors are still OFF when the timer expires, an error is displayed indicating that the switching cover is in a defective open state.

17 Claims, 9 Drawing Sheets

SHEET TRANSPORTATION APPARATUS CARRYING OUT ERROR DETERMINATION CONSIDERING SWITCHING OF SHEET TRANSPORTATION PATH

BACKGROUND OF THE INVENTION

1. Field of the Invention

The present invention relates to sheet transportation apparatuses, and more particularly to a sheet transportation apparatus included in a facsimile apparatus or the like that can have the transportation path of a read out original switched.

2. Description of the Related Art

A facsimile apparatus is proposed that has the switching of the transportation path of a read out original effected by opening/closing a switching cover. By this switching cover, the discharge direction of an original can be selected towards a desired direction.

Although the conventional facsimile apparatus can have switching of the transportation path carried out easily, inadvertent switching during transmission will result in detection of a defective open/close state of the transmission path during switching. Such a detection will cause an error to be displayed, whereby transmission is suppressed. When transportation path switching is carried out during transportation of an original, there is a possibility of determination made of a jam occurrence since an original is not transported through the transportation path specified at the start of original transportation although the original is discharged normally. Therefore, the usability of the apparatus was unsatisfactory.

SUMMARY OF THE INVENTION

An object of the present invention is to improve reliability in a sheet transportation apparatus.

Another object of the present invention is to prevent an error to be displayed inaccurately in a sheet transportation apparatus.

A further object of the present invention is to carry out a correct jam display in a sheet transportation apparatus.

Still another object of the present invention is to carry out an error display and a jam display considering switching of a transportation path being carried out.

To achieve the above objects, a sheet transportation apparatus according to an aspect of the present invention includes: a first transportation path, a second transportation path located backstream of the first transportation path, a guide member provided at the connection between the first and second transportation paths, movable between a first position guiding a sheet transported from the first transportation path to the second transportation path, and a second position that guides the sheet to a direction other than towards the second transportation path; a sensor for detecting the position of the guide member; a counter responsive to an output of the sensor indicating that the guide member is not located at the first or second position for initiating counting of a predetermined time period; and a determination unit for making determination of an error when the guide member is not located at the first or second position at the completion of counting by the counter.

According to the above-structured sheet transportation apparatus, determination is made of an error when the counting ends and when the guide member is not positioned at either the first or second position, so that error determination is carried out accurately according to the position of the guiding member.

In order to achieve the above objects, a sheet transportation apparatus according to another aspect of the present invention includes: a first transportation path; a second transportation path located backstream of the first transportation path; a switching mechanism having a movable guide member located at the trailing edge of the first transportation path, for switching the guide member between a state in which the sheet transported from the first transportation path is guided to the second transportation path and a state in which the sheet is guided towards a direction other than the second transportation path; a first sensor provided in the first transportation path for detecting a sheet; a second sensor provided in the second transportation path for detect a sheet; a counter responsive to a sheet detection output by the first sensor for initiating counting of a predetermined time period; and a confirmation unit for confirming the set state of the switching mechanism when the second sensor does not detect a sheet at the end of counting by the counter.

According to the above-structured sheet transportation apparatus, confirmation is made of the set state of the switching mechanism when the counting ends and when a sheet is not detected by the second sensor, so that inaccurate detection of a jam is prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
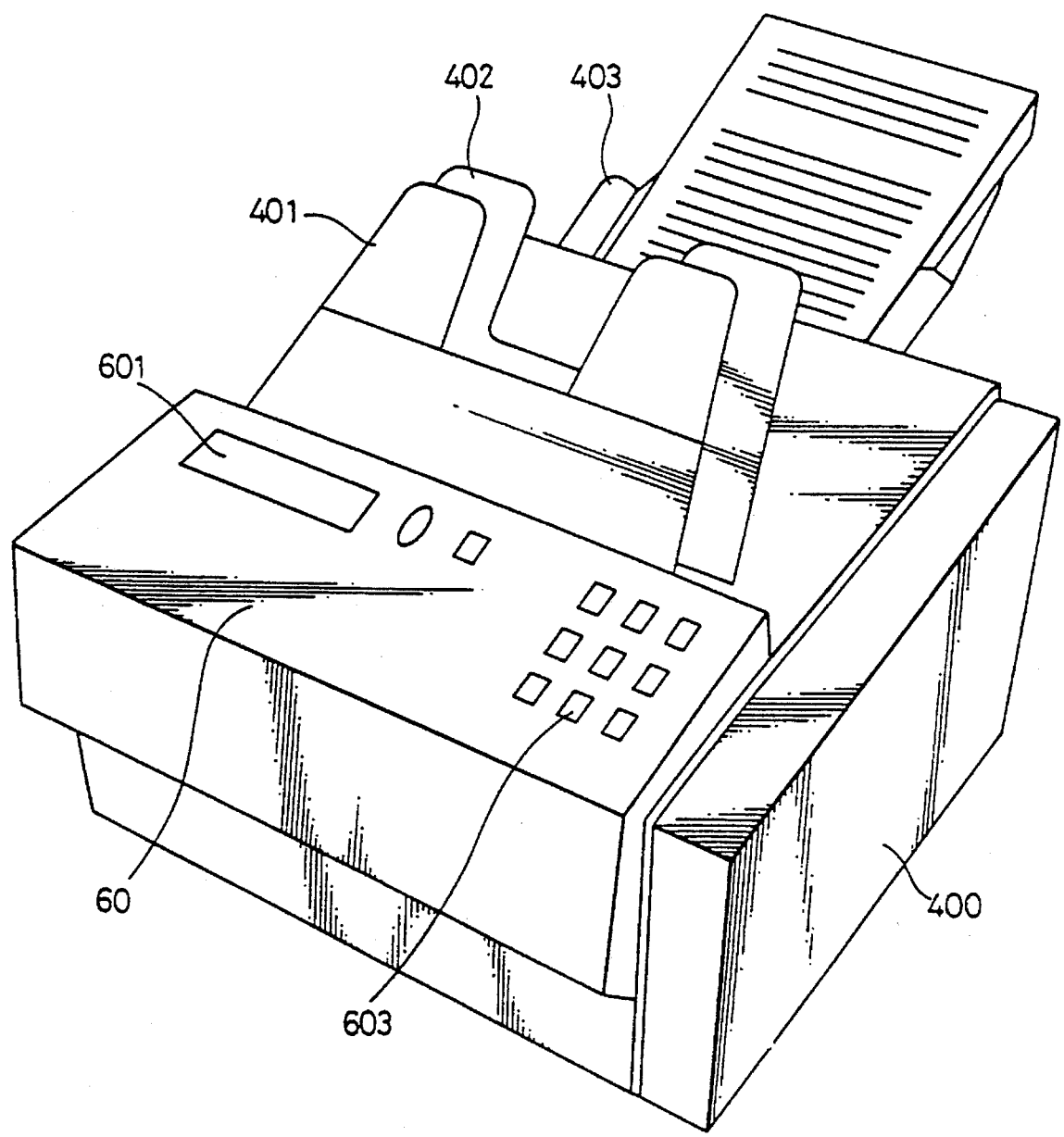
FIG. 1 is a perspective view showing the appearance of a facsimile apparatus according to an embodiment of the present invention.

FIG. 1 is a perspective view showing an appearance of a facsimile apparatus according to an embodiment of the present invention.

Referring to FIG. 1, a LCD 601 indicating the operational status of the facsimile apparatus, and a ten-key 603 for entering various numerals are provided on an operation panel 60 at the upper portion of a main body 400. An original to be transmitted is mounted on a tray 401 at the upper portion of the facsimile apparatus. The mounted original is transported to the interior of main body 400 by an automatic document feeder (ADF) to be read out by an image sensor (described afterwards). The read out original is discharged to a tray 402. At the backside of main body 400, a tray 403 is provided to which a recorded sheet after printing is discharged.

Figure 2:
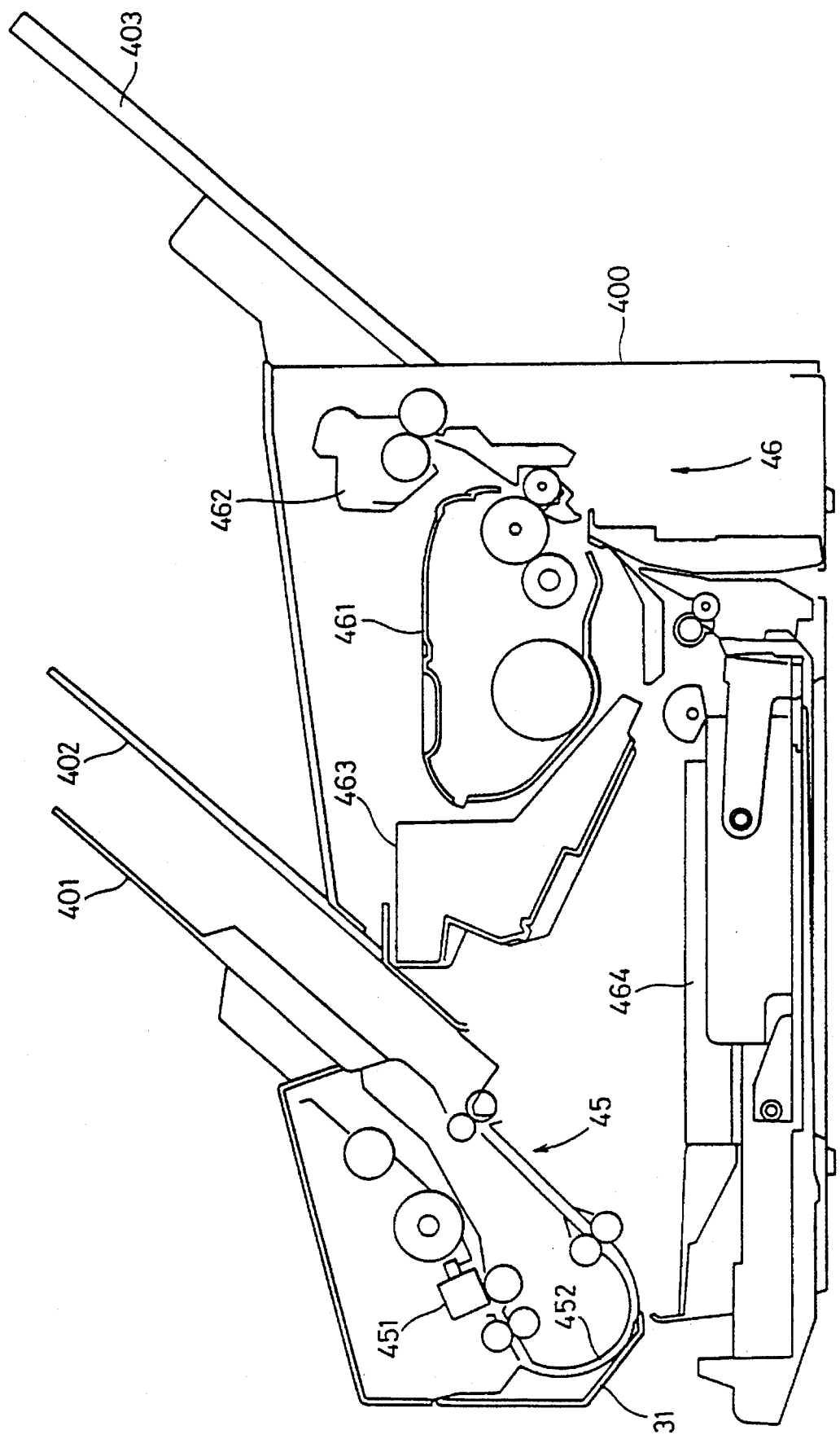
FIG. 2 is a sectional view showing the structure of the facsimile apparatus of FIG. 1.

FIG. 2 is a sectional view of the facsimile apparatus of FIG. 1.

Referring to FIG. 2, an image scanner 45 includes an image sensor 451 and the like for scanning the original to be transmitted. The original set at tray 401 and read out by image sensor 451 is discharged to tray 402 by an original transportation path 452. In addition to image sensor 451, image scanner 45 includes a driving motor for original transportation, a detection sensor for detecting the presence of an original, a cover open/close detection sensor, a jam detection sensor (details described afterwards), and the like. By opening transportation path switching cover 31, the original transportation path will proceed, not in the direction of a U-turn towards tray 402, but straight outside the facsimile apparatus from which the original is discharged.

A printer engine (recording unit) 46 is of the so-called electrophotographic system, and includes an imaging cartridge 461 of a photoreceptor drum, a developing unit, a toner box, and the like, a laser optical system 463 for forming an electrostatic latent image on the photoreceptor drum, and a fixing device 462 with a heater. A recording sheet stored in a feeding cassette 464 is transported to imaging cartridge 461 by a feeding roller (not shown), whereby a toner image is transferred onto the photoreceptor drum. The toner image on the recording sheet is heated by fixing device 462 to be fixed on the recording sheet. The recording sheet subjected to fixing is discharged onto tray 403.

Figure 3:
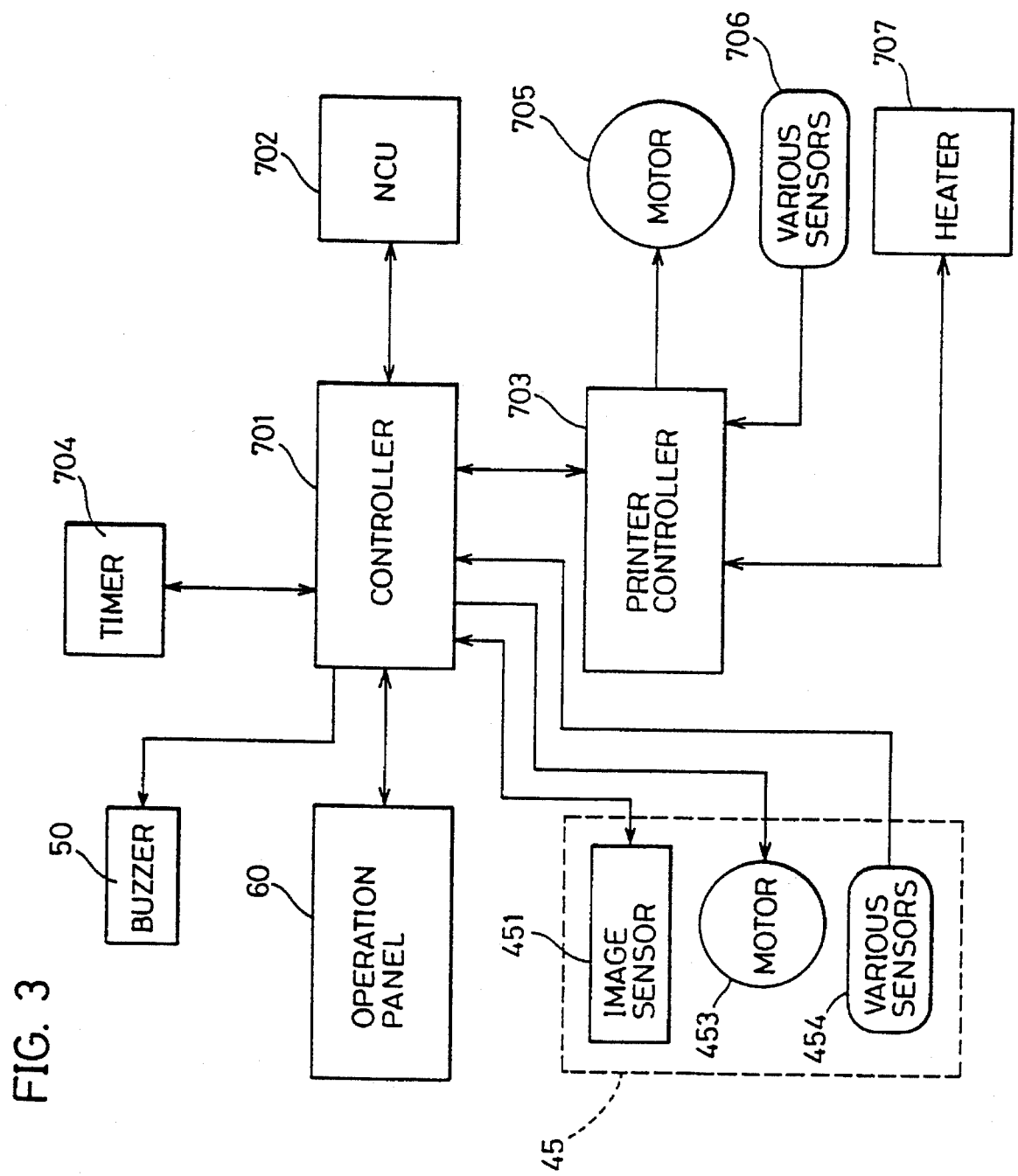
FIG. 3 is a system block diagram showing the control scheme of the facsimile apparatus of FIG. 1.

FIG. 3 is a system block diagram showing the control scheme of the facsimile apparatus of FIG. 1.

Referring to FIG. 3, a motor 705 serves to drive printer engine 46. Various sensors 706 include a paper sensor for detecting a recording sheet, a toner-empty sensor for detecting the remaining amount of the toner, and a temperature sensor for detecting the temperature of a heater 707. Heater 707 for fixing device 462 is formed of a halogen lamp or the like. Motor 705 and various sensors 706, and heater 707 have their operation controlled by a printer controller 703 formed of a CPU or the like.

A NCU (Network Control Unit) 702 controls data communication using a telephone line. A timer 704 formed of a counter timer controller or the like controls the timer operation of a power save mode and grasps the original transportation status. A buzzer 50 serves to notify that the setting of an original to be read out is completed. LCD 601 and ten-key 603 are included on operation panel 60. Image scanner 45 includes an image sensor 451 for reading out an original, a motor 453 for driving a roller or the like, and various sensors 454 for detecting whether there is an original or not. Controller 701 includes a CPU, an image memory, or the like, and serves to control the operation of the entire facsimile apparatus. The facsimile apparatus according to the prevent invention can carry out the so-called polling reception, timer polling reception, and transmission reservation, and the like.

Figure 4:
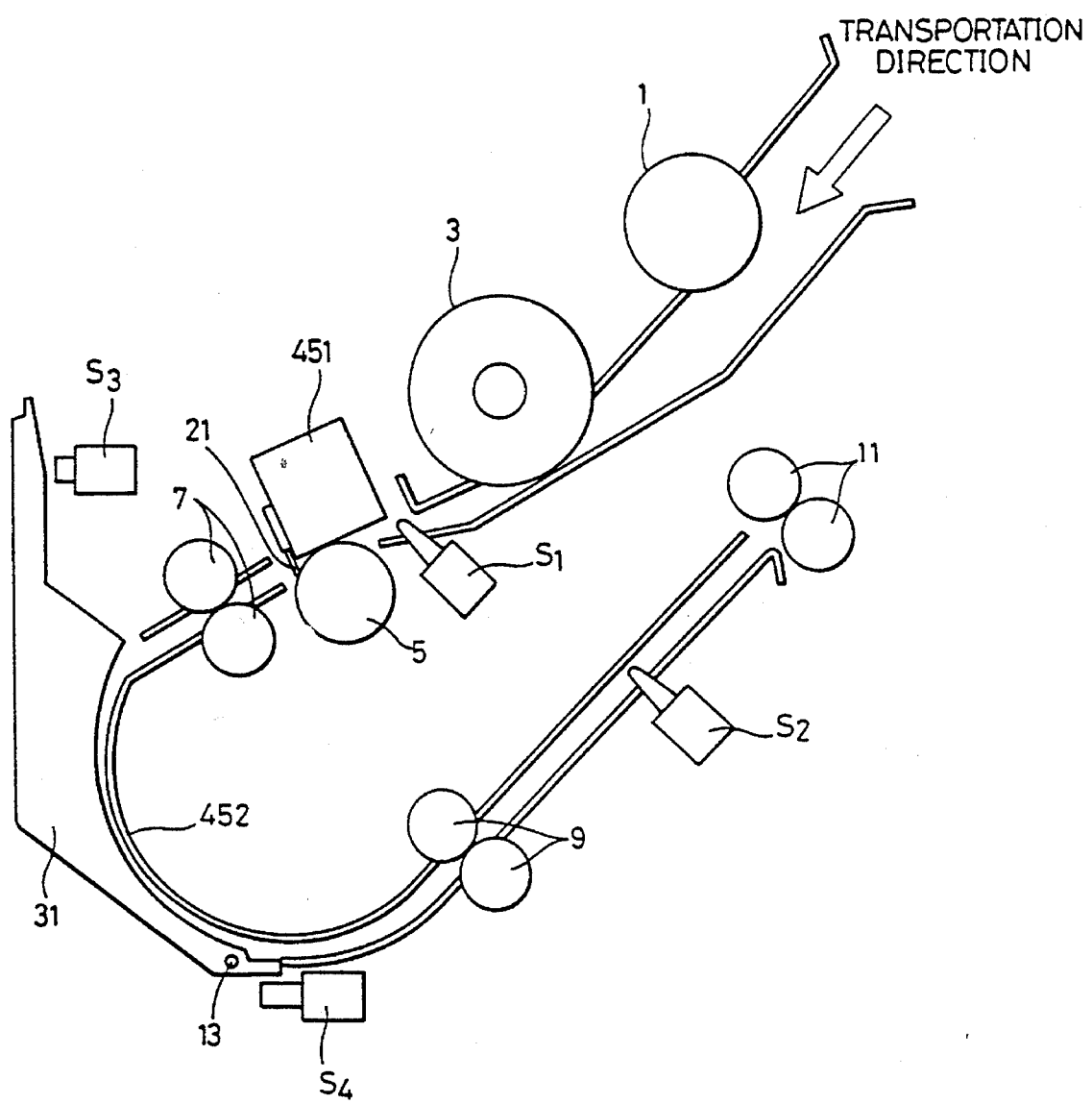
FIG. 4 is a sectional view showing a detailed structure of the image scanner unit of FIG. 2.

FIG. 4 is a sectional view of the main part of image scanner 45 and transportation path switching cover 31 of the facsimile apparatus of FIG. 1.

Referring to FIG. 4, first and second rollers 1 and 3 are provided upstream in the transportation direction of the original. Immediately succeeding the rollers in the downstream direction, there are provided a contact type image sensor 451 including a transportation start sensor S1, and a platen roller 5 facing image sensor 451. Immediately succeeding image sensor 451 in the downstream direction, a discharging brush 21 is provided. Downstream image sensor 451, a pair of first transportation rollers 7, and a transportation path switching cover 31 facing the U-shape formed original transportation path 452 are provided. Transportation path switching cover 31 is rotatable around an axis 13. At the upper and lower portions of transportation path switching cover 31, a cover open sensor S3 and a cover close sensor S4 for detecting the opened/closed state of transportation path switching cover 31 are provided, respectively. Downstream transportation path switching cover 31, a pair of second transportation rollers 9, and a pair of third transportation rollers 11 for discharging are provided. A jam detection sensor S2 for detecting jamming of an original is provided between second transportation roller 9 and third transportation roller 11.

Figure 5A:
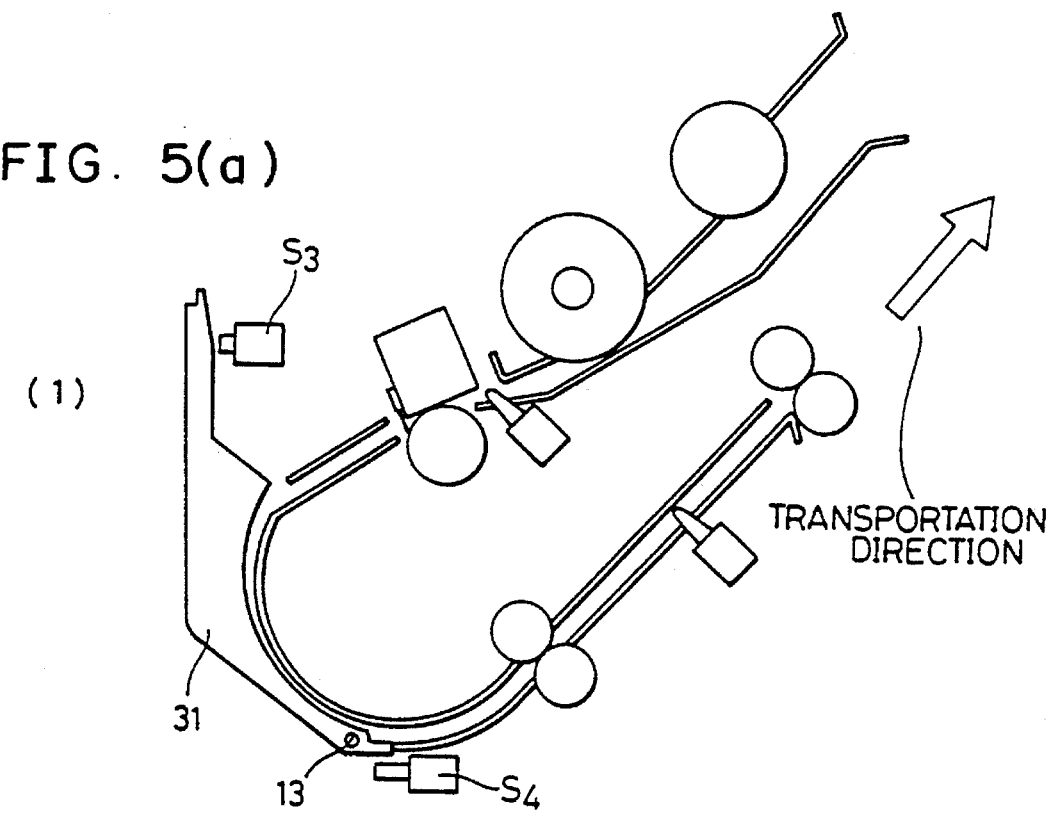
FIG. 5 shows the image scanner of FIG. 4 where the transportation direction is switched.
Figure 5B:
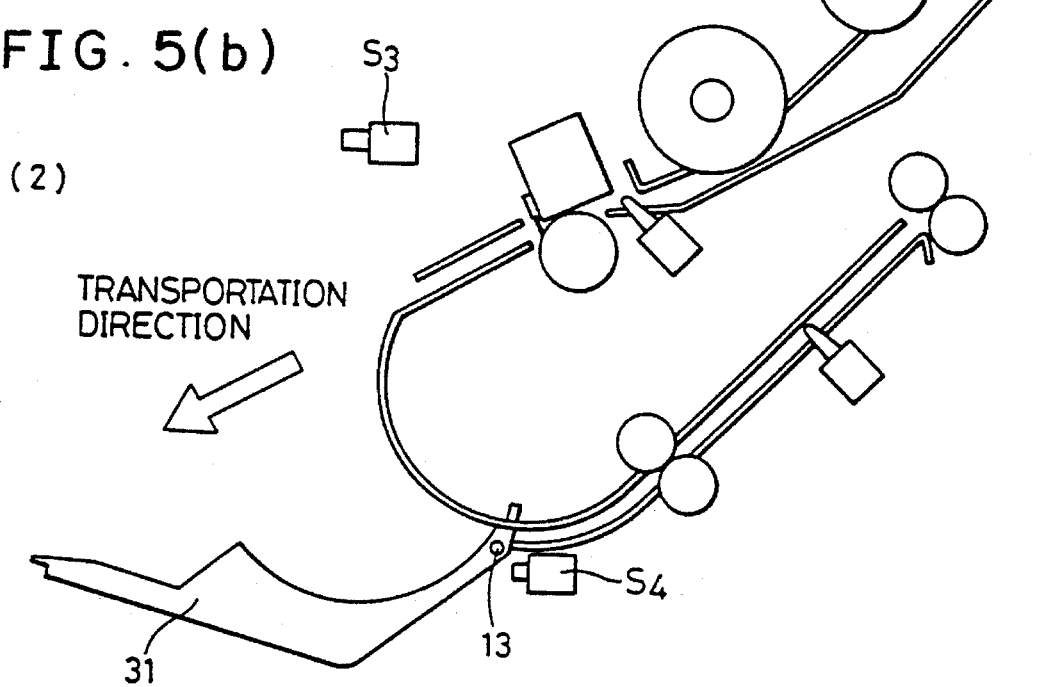

FIG. 5 shows the switching of a transportation path on the basis of the sectional view of FIG. 4.

FIG. 5(1) shows the state where transportation path switching cover 31 is closed. An original is conveyed in a U-turn manner by the curve of transportation path switching cover 31 to be discharged as shown by the arrow. Here, sensor S3 is in ON state, and sensor S4 is in OFF state.

FIG. 5(2) shows the state where transportation path switching cover 31 is opened. An original is discharged in a straight forward manner without taking a U-turn by the curve of transportation path switching cover 31, as shown by the arrow.

Here, sensor S3 is in OFF state, and sensor S4 is in ON state. By detecting the states of sensors S3 and S4, the open/close state of transportation path switching cover 31 can be detected.

Figure 6:
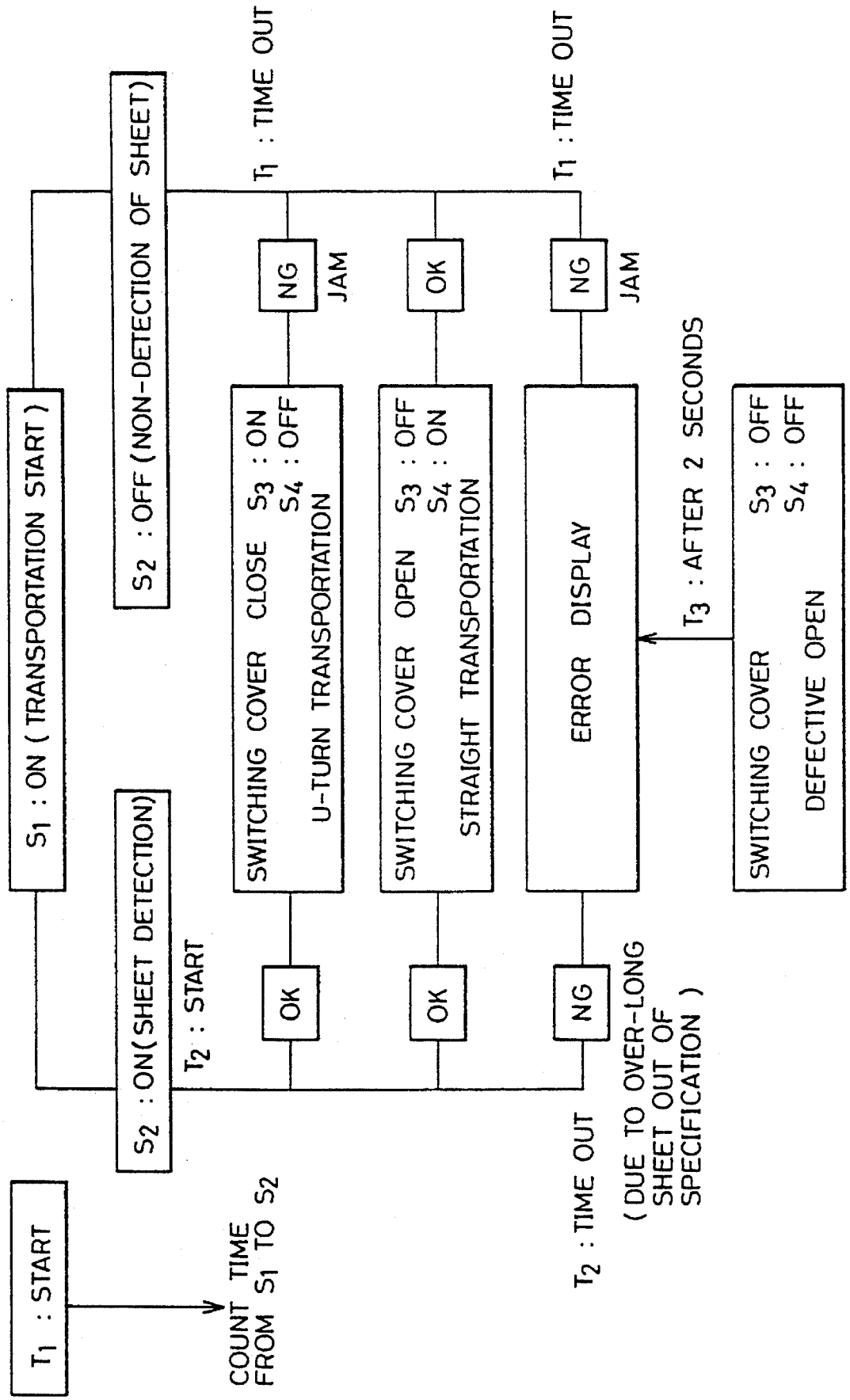
FIG. 6 is a diagram for describing a method of detecting erroneous transportation of an original.

FIG. 6 is a diagram for describing a detection method of an original transportation error according to an embodiment of the present invention.

The contents thereof will be described hereinafter with reference also to FIGS. 4 and 5.

When an original is set and a read out operation is specified from the operation panel, first roller 1, second roller 3, platen roller 5, and first transportation roller 7 are driven upon initiation of a read out, whereby the original is conveyed to image sensor 451. Here, transportation start sensor S1 is turned on to initiate counting of timer T1.

The original sheet read out by image sensor 451 is transported to platen roller 5 and first transportation roller 7.

Transportation is carried out towards one of two directions, i.e., transportation in a U-turn manner (referred to as "U-turn transportation" hereinafter) when transportation path switching cover 31 is closed as shown in FIG. 5(1), and transportation in a straight forward manner (referred to as "straight transportation" hereinafter) when transportation path switching cover 31 is opened as shown in FIG. 5(2). Although transportation path 452 is formed mainly by a transportation guide, the inner side of transportation path switching cover 31 becomes one part of the transportation path in U-turn transportation.

In straight transportation, the read out original passes through first transportation roller 7 to be directly discharged without taking a U-turn. More specifically, an original discharging unit for straight transportation is formed by the inner side of transportation path switching cover 31 succeeding first transportation roller 7 by opening transportation path switching cover 31. The original is discharged to this original discharging unit.

Cover close sensor S3 and cover open sensor S4 are provided in the vicinity of transportation path switching cover 31. The current state of transportation path switching cover 31, i.e. whether in a U-turn transportation or a straight transportation, is made by cover close sensor S3 and cover open sensor S4.

S3 is ON and S4 is OFF in the state of FIG. 5(1), so that determination is made that transportation path switching cover 31 is closed. This implies a U-turn transportation.

S3 is OFF and S4 is ON in the state of FIG. 5(2), whereby determination is made that transportation path switching cover 31 is opened. This implies a straight transportation.

When transportation path switching cover 31 is located at an intermediate position between the states of (1) and (2) of FIG. 5, S3 and S4 are both OFF. This implies that transportation path switching cover is in a defective open/close state, or partway a switching operation to either an opened or closed state of transportation path switching cover 31.

Jam Detection in U-Turn Transportation

In a U-turn transportation, a read out original is discharged after taking a U-turn along the transportation path. Jam sensor S2 is provided in the vicinity of the discharge portion, and a jam detection is carried out according to whether a transported original is detected or not. More specifically, if sensor S2 does not detect an original from the start until the expiration of timer T1, determination is made that the original is jammed, and an error is displayed at LCD display 601 on operation panel 60. The read out operation is suppressed.

Jam Detection in Straight Transportation

In a straight transportation, a jam detection by jam sensor S2 is not carried out since the original does not pass through jam sensor S2 located partway the U-turn transportation path. This prevents erroneous jam detection at the discharge unit of the U-turn transportation during a straight transportation operation.

Jam Detection When Transportation Path is Switched During Transportation

It cannot be identified when transportation path switching cover 31 is switched since it is operated manually. Even if transportation switching cover 31 is closed before an original read out operation starts to so as to carry out a U-turn transportation, there is a possibility of transportation path switching cover 31 being opened to switch to a straight transportation during transportation of the original after a read out operation is initiated.

In such a case, a jam will be detected according to timer T1 and jam sensor S2 even if the original is discharged under a straight transportation since timer T1 has initiated its counting due to the former setting of a U-turn transportation (sensor S3 is ON, and sensor S4 is OFF).

Therefore, detection is made again of the open/close state of cover 31 according to the ON/OFF of sensors S3 and S4. If a straight transportation is determined by the detection, detection of the expiration of timer T1 and an original non-detection by sensor S2 which are the conditions for a jam detection in a U-turn transportation will not be treated as a jamming occurrence. Therefore, erroneous detection of jamming is prevented.

Detection of an error is made when transportation path switching cover 31 is not completely opened/closed (when sensors S3 and S4 are both OFF). A read out operation of an original is inhibited when the opening/closing of transportation path switching cover 31 is defective. However, as described above, there is a state of transportation path switching cover 31 in partway a switching operation to either an opened or closed state during an original transportation, corresponding to a temporary defective open/close state (sensor S3 and sensor S4 are both OFF). If reconfirmation of transportation path switching cover 31 is executed for the above-described jam detection, an error will be generated to result in an unfavorable status of the reading operation being suppressed.

Therefore, the present invention has an error displayed only when the detection of a defective open/close state does not change after elapse of a predetermined time period (for example, 2 seconds by timer T3) starting from the detection of the defective open/close state of cover 31.

A process is carried out according to the above-described determination standard if the open/close state of transportation path switching cover 31 changes to an "opened" state or a "closed" state prior to elapse of a predetermined time period.

In the present embodiment, the maximum length of an original that can be read out is defined. Therefore, determination is made that the size of the original is an over-long sheet not confirming to the specification to display a error when sensor S2 is not turned off even after counter T2 expires.

Figure 7:
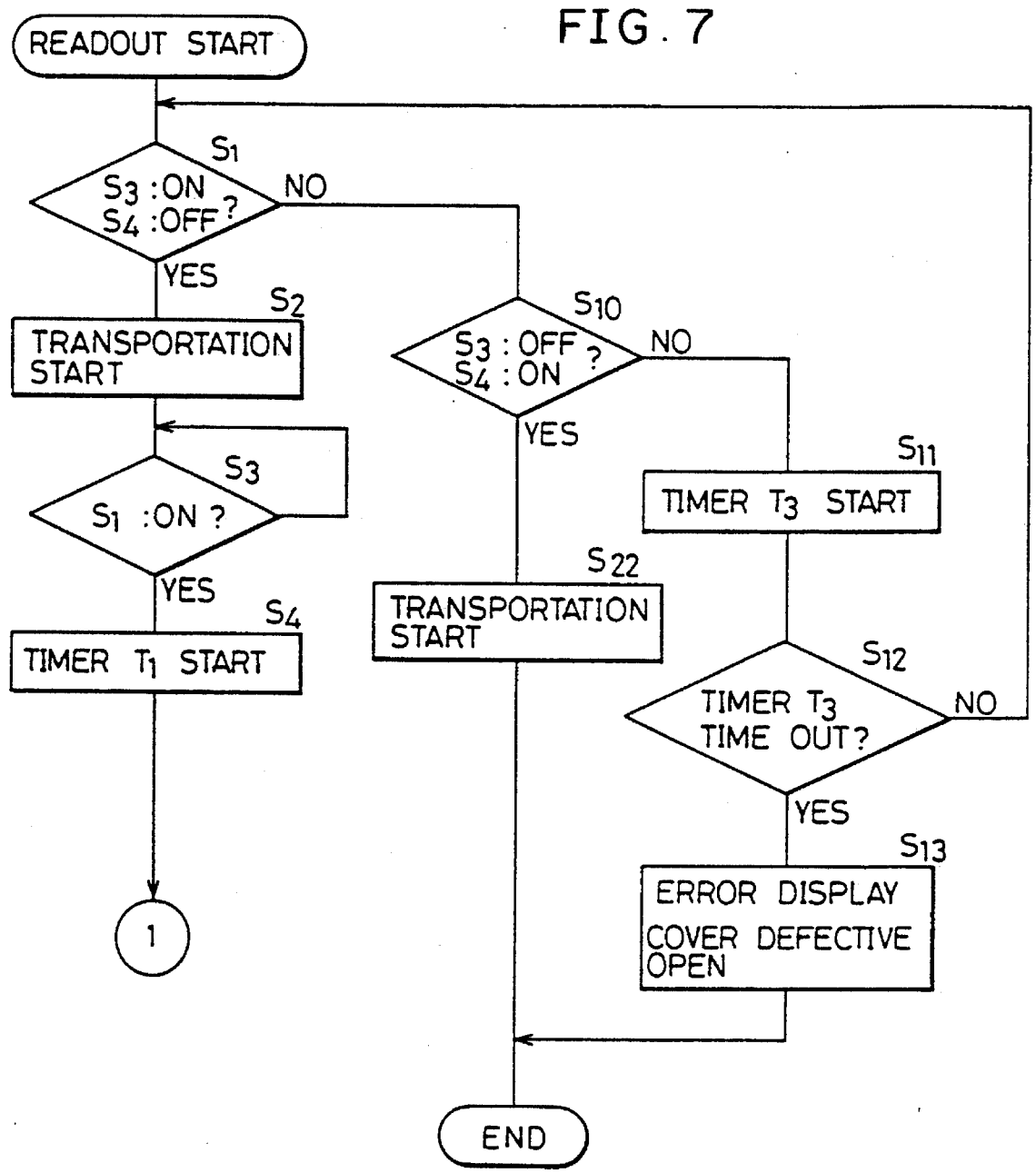
FIG. 7 is a partial flow chart showing the control of erroneous transportation detection of an original carried out by controller 701 of FIG. 3.
Figure 8:
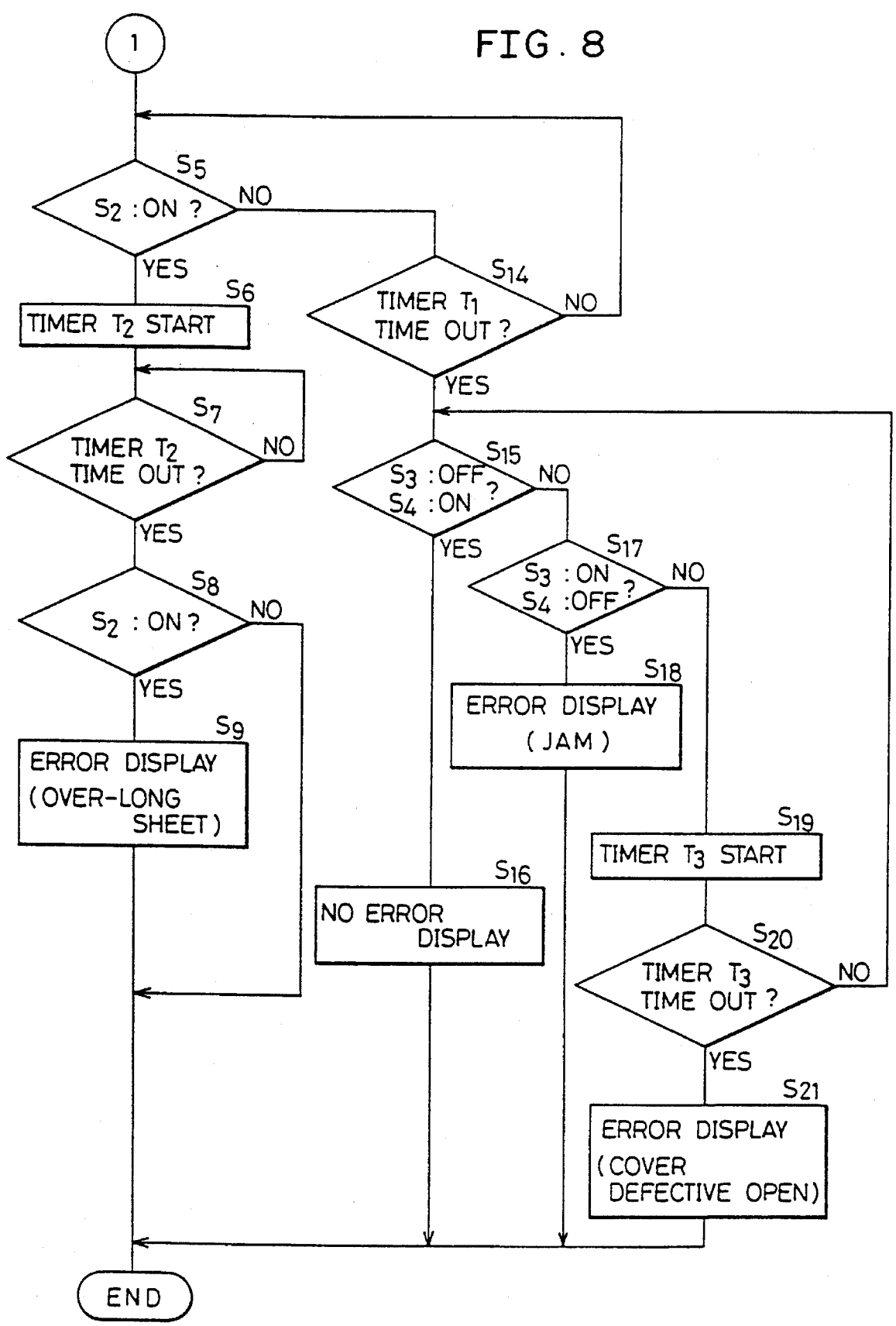
FIG. 8 is the other partial flow chart showing the control of erroneous transportation detection of an original carried out by controller 701 of FIG. 3.

FIGS. 7 and 8 are flow charts showing the control contents of the above-described detection of an erroneous transportation carried out by controller 701 of FIG. 3.

When initiation of a read out is specified, determination is made whether sensor S3 is ON and sensor S4 is OFF at step S1. More specifically, determination is made whether in a U-turn transportation according to a closed state of transportation path switching cover 31. When determination is made of a U-turn transportation, transportation of an original is initiated at step S2. Then at step S3, determination is made whether sensor S1 is ON or not. When sensor S1 is turned on, timer T1 starts at step S4. Then at step S5, determination is made whether sensor S2 is ON or not. When sensor S2 is turned on, i.e. when determination is made that the original has reached the portion of sensor S2, timer T2 starts at step S6. Waiting is conducted for timer T2 to expire, and determination is made again of an ON state of sensor S2 at step S8. Determination of an ON state of sensor S2 at step S8 implies that the length of the original is deviated from the specification. Therefore, at step S9, an error is displayed indicating an over-long original by the LCD of the operation panel of the facsimile apparatus. Thus, the process is completed.

When determination is made that transportation path switching cover 31 is not closed at step S1, the flow proceeds to step S10 where determination is made whether sensor S3 is OFF and sensor S4 is ON. When sensor S3 is OFF and sensor S4 is ON, determination is made that transportation path switching cover 31 is opened, i.e. a straight transportation is to be carried out. In this case, the process proceeds to S22 where transportation of the original is initiated, and the process ends without carrying a jam detection according to detection of an original by sensor S2.

If determination is made at step S10 that transportation path switching cover 31 is not at an "open" state, the flow proceeds to step S11 where timer T3 starts. At step S12, determination is made whether timer T3 has expired or not. If timer t3 has not yet expired, the flow returns to step S1 to repeat the determination made at steps S1, S10 and S12. If the state of sensors S3 and S4 change before the expiration of timer T3, determination is made that the switching operation of opening/closing transportation path switching cover 31 has been completed. The flow branches at step S1 or S10 to carry out various processes.

When determination is made that time T3 has expired at step S12, determination is made that a defective set status continues in which transportation path switching cover 31 is not in either state of opening/closing. The flow proceeds to step S13, where an error is displayed on the operation panel as "defective opening of cover", and the flow ends.

If sensor S2 is not ON at step S5, determination is made whether timer T1 has expired or not at step S14. The flow repeats step S5 until timer T1 expires. When determination is made at step S14 that timer T1 has expired, determination is made whether sensor S3 is OFF and sensor S4 is ON at step S15. More specifically, determination is made whether transportation switching cover 31 attains an "opened" state, i.e. a straight transportation, at step S15. When determination is made of a straight transportation at step S15, the read out original is discharged directly towards transportation path switching cover 31. The original will not arrive at the position of sensor S3, and an error is not displayed at step S16. Thus, the process ends.

When determination is made that transportation path switching cover 31 is not in a straight transportation state at step S15, determination is made whether sensor S3 is ON and sensor S4 is OFF at step S17. More specifically, determination is made whether in a U-turn transportation or not at step S17. If determination is made of U-turn transportation, determination is made of the original being jammed since the original that should arrive at the position of sensor S2 is not detected within the specified time period of timer T1. At step S18, an error is displayed implying occurrence of a jam at the operation panel, and the process ends.

When determination is made that transportation path switching cover 31 does not attain a U-turn transportation state at step S17, timer T3 starts at step S19. The flow repeats the determination made at steps S15, S17 and S20 until timer T3 expire. The specified time period of approximately two seconds for timer T3 is long enough to prevent the partway state of a switching operation from an opened or closed state to a closed or opened state of transportation path switching cover 31 from being detected as an error. Determination of expiration of timer T3 at step S20 implies that transportation path switching cover has not attained either an opened or closed state for 2 seconds. Therefore, an error is displayed indicating defective opening of cover 31 at step S21, and the process ends.

In the present embodiment, determination is made of a jam detection by confirming the open/close state of cover 31 at step S15 after expiration of timer T1 in step S14. Alternatively, the open/close state of cover 31 may be detected prior to expiration of timer T1, and if determination is made of a straight transportation where switching cover 31 attains an opened state, the process may be terminated without displaying an error regardless of the count of timer T1. Only when cover 31 is closed, determination of a jam may be made at the expiration of timer T1.

Figure 9A:
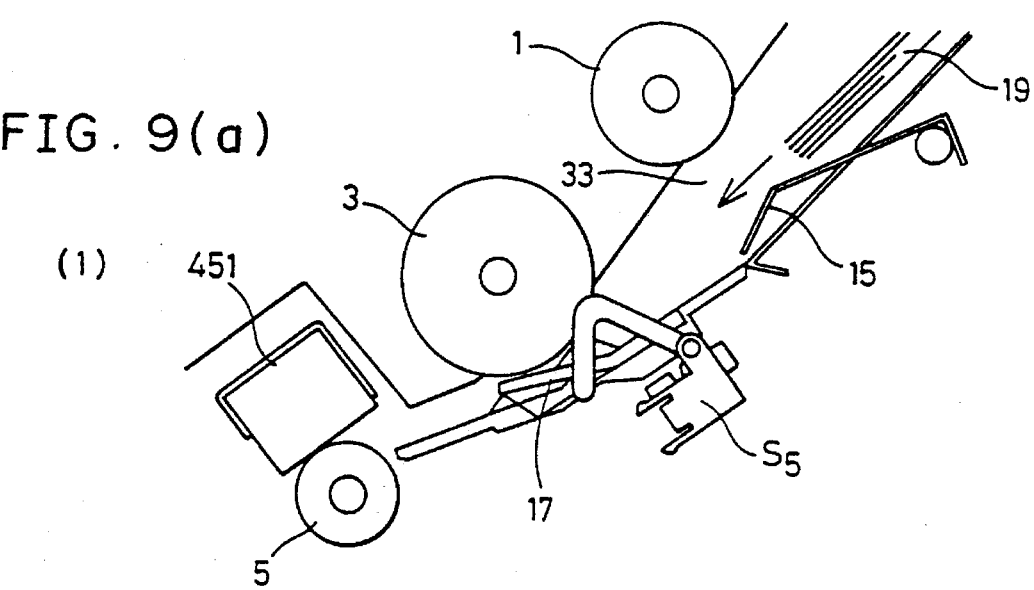
FIG. 9 is a diagram showing the details of the original feeding portion of the image scanner unit of FIG. 4.
Figure 9B:
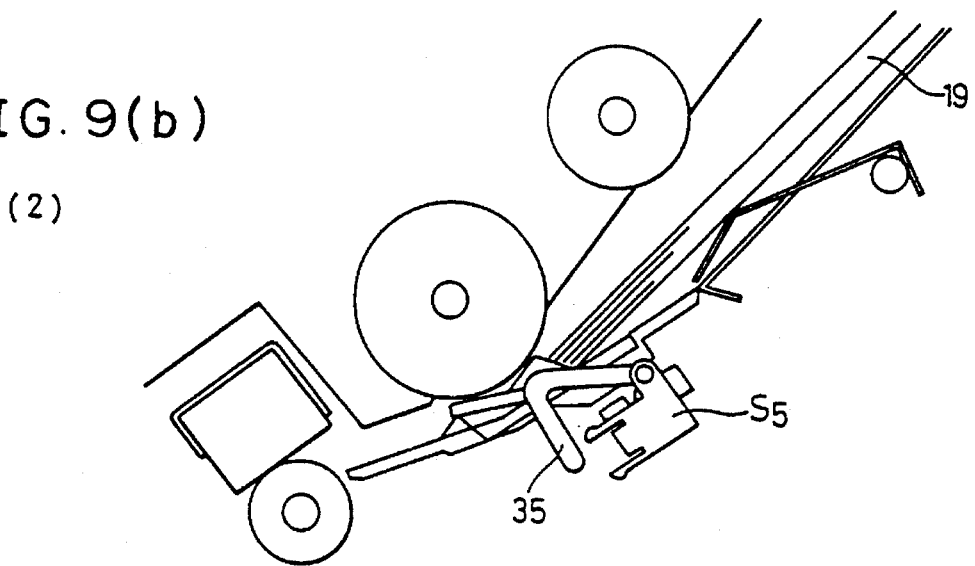
Figure 9C:
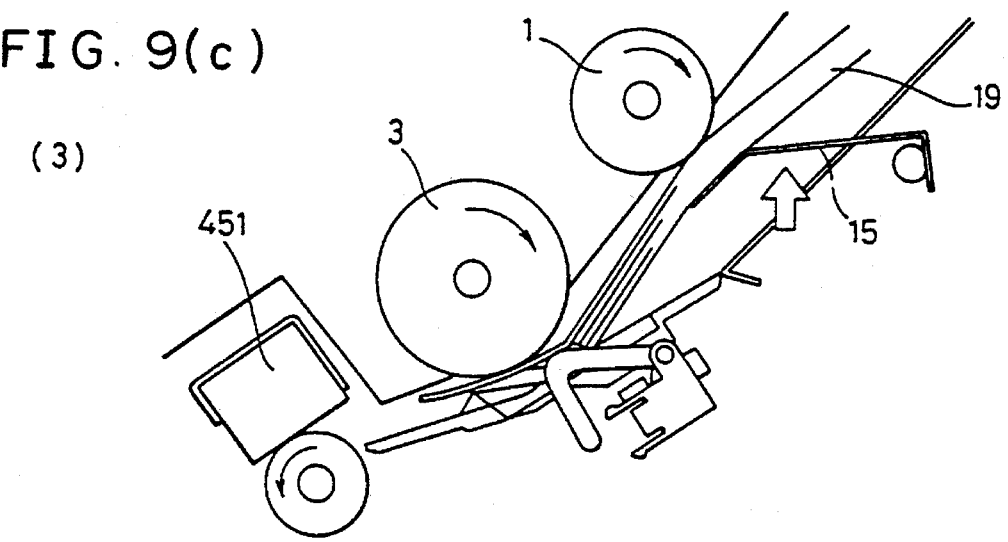

FIG. 9 is a sectional view of the image scanner unit of FIG. 4 showing in detail the document feeding portion of an automatic document feeder (ADF). Referring to FIG. 9, (1) shows the state prior to an original being set, (2) shows the state where setting of an original is completed, and (3) shows the state where transportation of the original is initiated by depressing a start key at the state of (2).

It was impossible to pull out or sort out originals once they were set in the ADF since a pre-feeding operation is initiated in a conventional facsimile apparatus. It was time consuming to take out an already set original. If an original was set in an oblique manner, it was directly fed to the reading unit, to becomes the cause of erroneous feeding. The present embodiment improves the usability of the user by improving such deficiencies and applies an original setting audible sound.

Referring to FIG. 9, a pressure plate 15 is provided at a transportation inlet 33 at a position facing first roller 1. An original detection sensor S5 and a separator 17 are provided at a position facing second roller 3.

FIG. 9(1) shows the state where a plurality of originals 19 are to be set at transportation inlet 33.

When originals 19 reach the position of separator 17, a signal indicating that originals 19 have been set is sent from sensor S5 to controller 701 by rotating a lever 35 downwards. Controller 701 responds to this signal to operate a buzzer 50 shown in FIG. 3 to notify the user that the originals have been set. Therefore, the user can identify whether the original has been accurately set in the ADF by the buzzer to prevent erroneous feeding due to improper setting of an original. By this addition of an audible sound responsive to setting of an original ensures the proper setting of an original for the user. In the state of FIG. 9(2), cancel of transmission or copying of the original already set can be facilitated since the original can be drawn out.

After the audible sound of the buzzer is confirmed at the state of FIG. 9(2), pressure plate 15 is lifted in response to specifying a transmission operation of the original from the operation panel, whereby the topmost sheet of the plurality of originals 19 is pressed by first roller 1. The topmost sheet of originals 19 is conveyed to the reading portion of image sensor 451 by rotation of first and second rollers 1 and 3. Thus, each sheet of the plurality of originals 19 is sequentially read by image sensor 451.

The present invention is not limited to the above-described embodiment where a facsimile apparatus is used, and the present invention is applicable to those having a transportation path as described above, such as a digital copier.

Although detection of the set state of transportation path switching cover 31 is carried out by sensors S3 and S4 in the above embodiment, a similar effect can be achieved using other status detection methods instead of these sensors.

Furthermore, although an error is displayed on the operation panel in response to generation of a jam in the above embodiments, an error may be notified by turning on a warning lamp or by an audible sound by a buzzer or the like instead.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sheet transportation apparatus comprising:
   a first transportation path, a second transportation path located downstream of said first transportation path, a guide member provided at the connection of said first and second transportation paths movable between a first position guiding a sheet transported from said first transportation path to said second transportation path and a second position leading to a direction other than said second transportation path, a sensor for detecting the position of said guide member, a counter responsive to an output of said sensor indicating that said guide member is not located at said first or second position for initiating counting of a predetermined time period, and a determination unit for making determination of an error when counting by said counter ends, and when said guide member is not located at said first or second position.

2. The apparatus according to claim 1, further comprising warning means for warning that there is an error in response to a determination output of an error by said determination unit.

3. The apparatus according to claim 2, wherein said warning means comprises a display unit for carrying out a display indicating that there is an error.

4. The apparatus according to claim 2, wherein said warning means generates a warning audible sound.

5. The apparatus according to claim 1, wherein said determination unit makes a determination in response to an output of said sensor when counting of said counter ends.

6. The apparatus according to claim 5, wherein said determination unit does not carry out determination at the end of counting when there is a sensor output indicating that said guide member is located at said first or second position during counting of said counter.

7. A sheet transportation apparatus comprising:

a first transportation path, a second transportation path located backstream of said first transportation path, a switching mechanism including a movable guide member located at the trailing edge of said first transportation path, wherein said guiding member switches to a state in which a sheet transported from said first transportation path is guided to said second transportation path and a state in which the sheet is guided to a direction other than said second transportation path, a first sensor provided in said first transportation path for detecting a sheet, a second sensor provided in said second transportation path for detecting a sheet, a counter responsive to an output of a paper detection by said first sensor for initiating counting of a predetermined time, and confirmation means for confirming a set state of said switching mechanism when counting by said counter ends and when said second sensor does not detect a sheet.

8. The apparatus according to claim 7, further comprising:

a second counter responsive to an output indicating that the set state of said switching mechanism is in the midst of a switching operation by said confirmation means for initiating counting of a predetermined time period, and display means for displaying an error when counting by said second counter ends, and when said confirmation means does not detect completion of switching of the set state of said switching mechanism.

9. The apparatus according to claim 7, further comprising:

warning means for warning there is an error in response to a determination output by said confirmation means that said switching mechanism is in a state guiding a sheet to said second transportation path.

10. The apparatus according to claim 9, wherein said warning means comprises a display unit for effecting a display indicating that there is an error.

11. The apparatus according to claim 9, wherein said warning means generates a warning audible sound.

12. A sheet transportation apparatus comprising:

a transportation path, a first sensor for detecting that an original has passed a first position of said transportation path, a second sensor for detecting that an original has passed a second position of said transportation path, wherein said second position is located downstream of the transportation direction with respect to said first position, a switching mechanism provided between said first and second positions of said transportation path for switching said transportation path so as to transport an original passing said first position to a third position differing from said second position, a counter responsive to a detection output of said first sensor for initiating counting of a predetermined time period, confirmation means for confirming a set state of said switching mechanism, and control means for making determination of an error when counting of a predetermined time period by said counter ends without detection of a passage of a sheet by said second sensor, and when confirmation is made by said confirmation means that the set state of said switching mechanism is in a state of sending a sheet from said first position to said second position.

13. The apparatus according to claim 12, further comprising:

a display unit for displaying that there is an error in response to a determination output of an error by said control means.

14. The apparatus according to claim 12, further comprising:

warning means for generating a warning audible sound in response to a determination output of an error by said control means.

15. A sheet transportation apparatus comprising:

a transportation path, a first sensor for detecting that a sheet has passed a first position of said transportation path, a second sensor for detecting that a sheet has passed a second position of said transportation path, wherein said second position is located downstream of the transportation direction with respect to said first position, a switching mechanism provided between said first and second positions of said transportation path for switching said transportation path to transport a sheet passing through said first position to a third position differing from said second position, a counter responsive to a detection by said first sensor for initiating counting of a predetermined time period, confirmation means for confirming the set state of said switching mechanism, and control means, confirming the set state of said switching mechanism by said confirmation means after initiating counting by said counter for error control according to the set state of said switching mechanism and detection of said second sensor.

16. The apparatus according to claim 15, wherein said control means suspends error detection according to detection by said second sensor when the set state of said switching mechanism is in a state where a sheet passing through said first position is led to a third position.

17. The apparatus according to claim 15, wherein said control means makes determination of an error when the set state of said switching mechanism is in a state where an original passing said first position is to be led to said second position, and counting by said counter ends without detection of passage of a sheet by said second sensor.

* * * * *